United States Patent
Mudulodu et al.

(10) Patent No.: US 12,511,285 B2
(45) Date of Patent: Dec. 30, 2025

(54) MACHINE LEARNING BASED GENERATION OF QUERIES AND RESPONSES FOR PROCEEDING FRAMEWORKS

(71) Applicant: ADP, Inc., Roseland, NJ (US)

(72) Inventors: Sai Mudulodu, Suwanee, GA (US); Seema Jayaram, Bridgewater, NJ (US); Fernando Schwartz, New York City, NY (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/759,396

(22) Filed: Jun. 28, 2024

(65) Prior Publication Data

US 2025/0005021 A1 Jan. 2, 2025

Related U.S. Application Data

(60) Provisional application No. 63/511,509, filed on Jun. 30, 2023.

(51) Int. Cl.
*G06F 7/00* (2006.01)
*G06F 16/2453* (2019.01)
*G06F 16/28* (2019.01)
*G06N 3/0475* (2023.01)

(52) U.S. Cl.
CPC ...... *G06F 16/24534* (2019.01); *G06F 16/285* (2019.01); *G06N 3/0475* (2023.01)

(58) Field of Classification Search
CPC ............ G06F 16/24534; G06F 16/285; G06N 3/0475
USPC .................................................. 707/600–899
See application file for complete search history.

(56) References Cited

U.S. PATENT DOCUMENTS

2021/0397610 A1* 12/2021 Singh .................... G06N 3/045

* cited by examiner

*Primary Examiner* — Isaac M Woo
(74) *Attorney, Agent, or Firm* — Foley & Lardner LLP

(57) ABSTRACT

The technical solutions provide ML-based generation of queries and responses for operational frameworks of entities. A processor can identify queries of a processing frameworks for an entity and construct embeddings for the queries. Each embedding can correspond to a vector of a query of the plurality of queries that form a plurality of clusters in a vector space. The processor can generate, for each cluster, using API calls to ML models, a cluster query and a cluster response for the cluster query and store, in a storage, a mapping of each cluster query to each cluster response. The processor can receive, from a client, a request and select, using the mapping, the cluster response based on a relation between the cluster query and the request. The processor can provide, to the client, the selected cluster response responsive to the request.

20 Claims, 8 Drawing Sheets

Policy Personalization

Current list of Policy Questions answered

Topics ↑    Question Name ◇

∨ Benefits (7)

Where can I get my Medical benefits card / info?

Who handles my retirement FSA?

Who handles my retirement plan / 401K?

When can I enroll in Benefits?

Who handles my retirement HSA?

Where can I get my Dental benefits card / info?

Where can I get my Vision benefits card / info?

∨ Time off (9)

For what reasons can I take a leave of absence?

When does the company observe holidays that fall on a weekend?

Does my company offer floating holidays?

What happens to my unused accrued time off at the end of the year?

Can/will I be paid out for unused PTO after termination?

---

← Back Benefits

When can I enroll in Benefits?

Answer (e.g., 365) ⓘ

Go to https://benefits.fakecompany.com to compare the plans for next year along with recommendations of appropriate plans for you and your family on the site.

244/300

Publish Date      End date

DD/MM/YYYY 🗓        Never 🗓

Acknowledgement

I agree that does not review, approve or hold any liability with respect to these policies. The sole responsibility around the policies uploaded here lies with my own company.

☐ I agree and accept this acknowledgement

[Approve]    [Save]    [Delete]

---

Answer Preview (e.g., 365)

When can I enroll in benefits?

Here's what I found:

On MM/DD/YY, the response will be:

Go to https://benefits.fakecompany.com to compare the plans for next year align with recommendations of appropriate pains for you and your family on the site.

Did you know that fakecompany now supports same gender couples and domestic partners

FIG. 6

MACHINE LEARNING BASED GENERATION OF QUERIES AND RESPONSES FOR PROCEEDING FRAMEWORKS

CROSS-REFERENCES TO RELATED APPLICATIONS

This application claims the benefit of priority under 35 U.S.C. § 119 to U.S. Provisional Patent Application No. 63/511,509, filed Jun. 30, 2023, which is hereby incorporated by reference herein in its entirety.

TECHNICAL FIELD

The disclosure relates generally to computing technology and, in particular, to a machine learning (ML) based queries and responses for processing framework accessed by client devices via a digital assistant interface.

BACKGROUND

Enterprises can utilize servers to execute computing tasks or processes invoked by client devices. However, it can be challenging for servers to efficiently and reliable generate and deliver responses in compute and energy efficient manner.

SUMMARY

The technical solutions of this disclosure provide efficient and reliable machine learning (ML)-based automatic generation of queries and responses within processing frameworks of entities. As entities can perform complex and resource-intensive tasks, these tasks can vary significantly across various processing frameworks, making data processing challenging and compute-resource and energy inefficient. These technical solutions address such challenges by using virtual assistant accessible ML-based generation of query-response pairs for FAQ services using historical client queries to generate embeddings and create clusters of frequently asked questions. These queries and responses can be editable for accuracy and compliance, and the system can match future incoming requests to the most suitable pre-generated query-response pairs, saving the storage space, computational resources, and energy, while maintaining the accuracy and quality of the responses.

An aspect of the technical solutions disclosed herein relates to a system. The system can include one or more processors coupled with memory and configured to identify a plurality of queries corresponding to a plurality of processing frameworks for an entity. The one or more processors can be configured to construct a plurality of embeddings for the plurality of queries. Each embedding of the plurality of embeddings can correspond to a vector representation of at least a portion of a query of the plurality of queries. The one or more processors can be configured to form a plurality of clusters for the plurality of queries based on distances in a vector space between the vector representations of the plurality of embeddings. The one or more processors can be configured to generate, for each cluster of the plurality of clusters, using one or more application programming interface (API) requests to one or more machine learning (ML) models trained on a dataset for the plurality of policies, a cluster query on a processing framework of the plurality of processing frameworks for the respective cluster and a cluster response to the cluster query. The one or more processors can be configured to store, in a storage, a mapping of each cluster query to each cluster response for each of the plurality of clusters. The one or more processors can be configured to receive, from a client device, a request for information regarding at least one of the plurality of processing frameworks. The one or more processors can be configured to select, using the mapping, the cluster response based on a relation between the cluster query and the request. The one or more processors can be configured to provide, from the storage, for display on the client device, the selected cluster response responsive to the request.

An aspect of the technical solutions disclosed herein relates to a method. The method can include one or more processors coupled with memory identifying a plurality of queries corresponding to a plurality of processing frameworks for an entity. The method can include the one or more processors constructing a plurality of embeddings for the plurality of queries. Each embedding of the plurality of embeddings can correspond to a vector representation of at least a portion of a query of the plurality of queries. The method can include the one or more processors forming a plurality of clusters for the plurality of queries based on distances in a vector space between the vector representations of the plurality of embeddings. The method can include the one or more processors generating, for each cluster of the plurality of clusters, using one or more application programming interface (API) requests to one or more machine learning (ML) models trained on a dataset for the plurality of policies, a cluster query on a processing framework of the plurality of processing frameworks for the respective cluster and a cluster response to the cluster query. The method can include the one or more processors storing, in a storage, a mapping of each cluster query to each cluster response for each of the plurality of clusters. The method can include the one or more processors receiving, from a client device, a request for information regarding at least one of the plurality of processing frameworks. The method can include the one or more processors selecting, using the mapping, the cluster response based on a relation between the cluster query and the request. The method can include the one or more processors providing, from the storage, for display on the client device, the selected cluster response to the request.

An aspect of the technical solutions disclosed herein relates to a non-transitory computer readable medium storing program instructions. The program instructions can be configured for causing at least one processor to identify a plurality of queries corresponding to a plurality of processing frameworks for an entity. The program instructions can be configured for causing the at least one processor to construct a plurality of embeddings for the plurality of queries. Each embedding of the plurality of embeddings can correspond to a vector representation of at least a portion of a query of the plurality of queries. The program instructions can be configured for causing at least one processor to form a plurality of clusters for the plurality of queries based on distances in a vector space between the vector representations of the plurality of embeddings. The program instructions can be configured for causing at least one processor to generate, for each cluster of the plurality of clusters, using one or more application programming interface (API) requests to one or more machine learning (ML) models trained on a dataset for the plurality of policies, a cluster query on a processing framework of the plurality of processing frameworks for the respective cluster and a cluster response to the cluster query. The program instructions can be configured for causing at least one processor to store, in a storage, a mapping of each cluster query to each cluster response for each of the plurality of clusters. The program instructions can be configured for causing at least one processor to receive, from a client device, a request for information regarding at least one of the plurality of processing frameworks. The program instructions can be configured for causing at least one processor to select, using the mapping, the cluster response based on a relation between the cluster query and the request. The program instructions can be configured for causing at least one processor to provide, from the storage, for display on the client device, the selected cluster response responsive to the request.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 6 shows an example graphical user interfaces for implementing a processing framework function, in accordance with aspects of the present disclosure.

DETAILED DESCRIPTION

Figure 1:
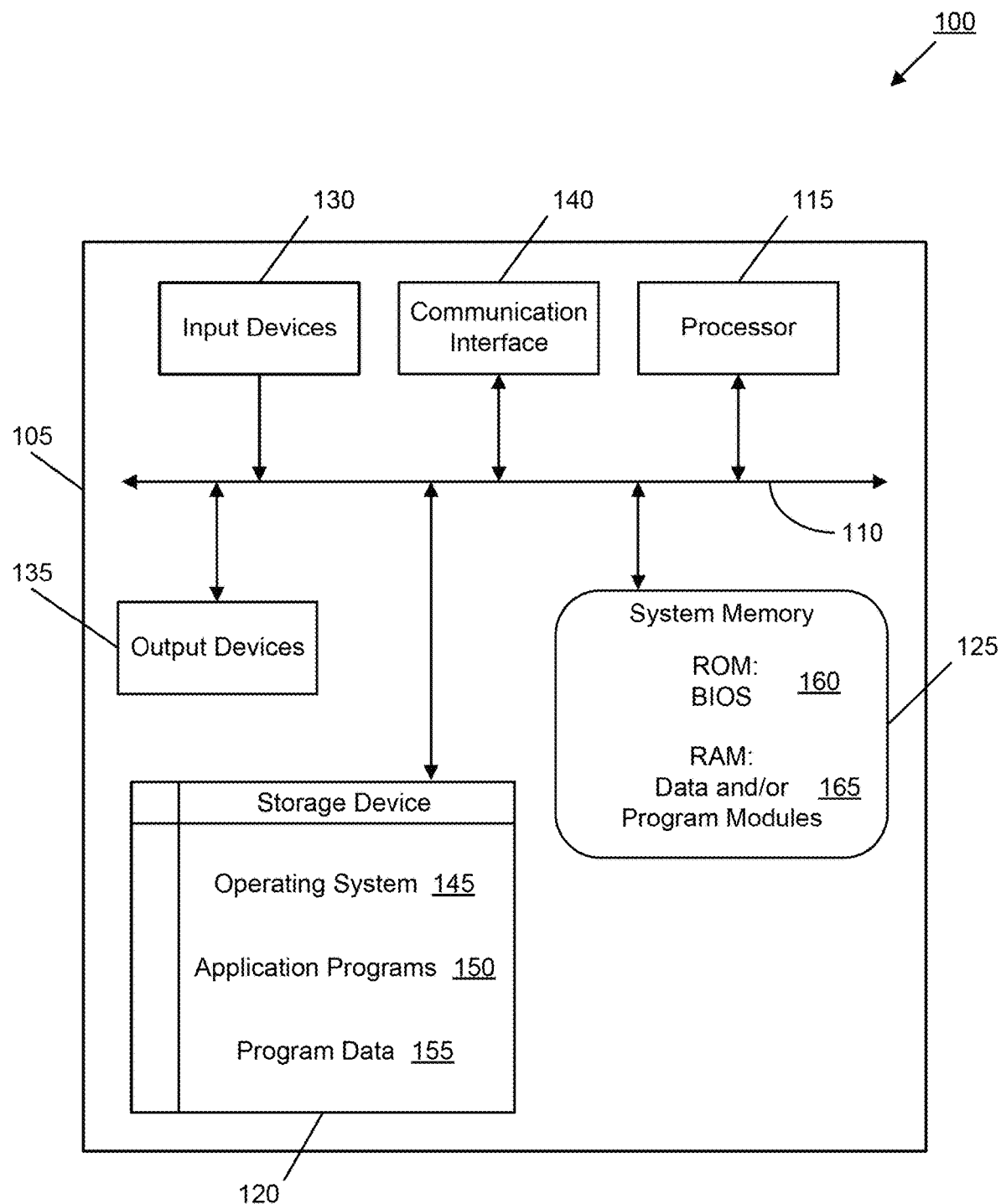
FIG. 1 is an illustrative architecture of a computing system implemented in embodiments of the present disclosure.

The technical solutions provide efficient and reliable ML-based generation of queries and responses for processing frameworks of entities. Entities, such as, enterprises, corporations or organizations, can perform various time, energy and compute intensive services, such as human resource (HR) or payroll services. These services can involve variations across operational frameworks (e.g., processes, procedures or operational policies) impacting digital processing of data pertaining to management and support of various entity client devices. However, it can be challenging and energy inefficient for an entity to manage a large volume of such diverse computational tasks given the variations across the operational frameworks of the HR or payroll tasks. For instance, if an entity prepares a large number of query-response pairs to serve upon client requests as frequently asked questions (FAQs), such data may both occupy a lot of storage space and be difficult to update in the event of changes to the underlying operational procedures or documents.

The technical solutions of this disclosure overcome these and other challenges by providing virtual assistant accessible ML-based generation of query-response pairs for FAQ services based on automated ML-based mapping and clustering of prior client queries. The technical solutions can generate embeddings for various prior historical client device query data to generate a mapping of clusters of most frequently asked questions for serving in response to future client device queries. The generated queries and responses can be edited and verified for accuracy and compliance. The technical solutions can utilize the embeddings and the mapping to match future incoming requests and identify most suitable query-response pairs from the FAQs, along with any metadata (e.g., tags or links about source materials) to provide along with the responses. Utilizing the mappings and the clustering, the technical solutions can save the space for the client device query-response pairs without sacrificing accuracy or quality of the responses, while also saving computational resources and energy by serving pre-generated responses to user requests directly from storage.

The technical solutions can provide a ML-based virtual assistant allowing client devices to access reliable ML-generated answers for various entity operational frameworks, such as procedure or policy related queries impacting entity operations. For instance, the technical solutions can summarize for a client device a response (e.g., an answer to a question) on an entity-related policy related to organizational forms, documents, guidelines and employee handbooks that can be used for training of the ML models. The technical solutions can include ML technology, such as generative artificial intelligence (gen AI or GAI) models to allow the system to generate or predict (e.g., based on clusters of prior client queries) questions that may be received in the future. The technical solutions can utilize ML models to generate responses (e.g., answers to such questions) using various entity documentation data, forms, procedures, flow diagrams or formulas, each of which can be updated over time. The technical solutions can store the query-response pairs in storage based on a clustered mapping in an embedding space and metadata for underlying support documentation.

The technical solutions can also include a functionality for determining that an incoming query from one of the client devices is different from existing query-response pairs (e.g., not yet addressed by any of the prior questions). Responsive to such a determination, the technical solutions can use the ML models to generate a response to such a query in real time and provide it to the client device. The response can be reviewed and verified for accuracy, prior to the response, or can be accompanied by a message indicative of an ongoing or an incomplete quality review. The query-response pairs can be curated using the system admin (e.g., HR personnel) and used for future retraining and re-clustering.

In an example, the technical solutions can provide services to various client entities, such as enterprises or organizations, outsourcing business units (e.g., HR Outsourcing or HRO) and national occupational standards (NAS) classification of occupations (COS)/public service commissions (PSC). Client entities can utilize the technical solutions of the present disclosure to automatically generate and provide clear, consistent, concise answers to various entity-related operational framework in the form of frequently asked questions (FAQs). For instance, the technical solutions can generate FAQs for entity-related operational framework (e.g., company policy-related questions) that may be asked by users on client devices of the entity (e.g., employees of a company) through a virtual assistant tool. The technical solutions can present enterprises with a preset list of categorized policy questions and allow the system to provide an answer, that the enterprise admin can vet and approve (e.g., curate), prior to the query-response pair being included in the FAQ list of questions and answers.

A client entity (e.g., an enterprise utilizing the technical solutions) can add a citation or a tag to the query-response pair (e.g., question-answer pair for the FAQ). For instance, one of the query (e.g., question) or the response (e.g., answer) can be supplemented, tagged or marked with a metadata entry for a document providing the answer to the question (e.g., a link to a policy document in a storage or a database, which the entity can use for policy acknowledgement. The tag or a mark can indicate or include a page number of the policy information in the linked document. The metadata can be provided to the client device in response to the query to allow the client device (e.g., an employee of the entity corporation) to access the source of the detailed information. The technical solutions can provide (e.g., via an interface) one or more detailed features, such as future roadmap items or leveraging documents can include human capital management (HCM) system of record (SoR) for the entity.

The technical solutions can include or provide a system for authoring or generating automated or semi-automated query-response pairs for various types of operational frameworks. The operational frameworks can include any one or more processes, procedures, rules or policies for performing any tasks or services of an entity, such as an enterprise, corporation or an organization. Operational frameworks can involve, or be based on, information or topics related to enterprise policies, tax-related questions, computational workflow, personalized financial data, payroll or employee guideline information. Questions related to any of the operational frameworks can be received from client devices (e.g., employees or service providers of an enterprise). Responses to such questions can be provided via a FAQ service generated based on a history of client device queries gathered over a time period and clustered based on their topics or subject matter. For example, in order to reduce the computational resources and the burden of the client practitioner in providing and storing answers to various client device questions, the technical solutions can utilize one or more ML models that can be trained using datasets of relevant policies, guidelines and information data of an entity. The datasets can be formed using client-provided policy documents and employee handbooks stored in ADP HCM SoRs or based on information from curated question-response pairs. For example, a dataset can include details as to the amount of sick time an employee has accrued, list of holidays observed by the entity, procedures or processes implemented by the entity for various operational or computational services, such as tax-related or payroll related services, or any other purpose. Using a combination of curated question-response pairs, the technical solutions can utilize and apply client data to provide personalized answers for the user-specific questions, based on the enterprise policies and the personal information of that specific user (e.g., the exact number of vacation days accrued by a specific employee of the entity).

Rather than having entity practitioners scan through entity documents and generate written summary responses to the client device questions, the technical solutions can utilize automatically generated and curated query-response pairs to identify the closest or the most similar question to client device query. In doing so, the technical solutions can reduce the time and the computational resources of the client device to find the answer, allowing the user to follow the response to the most closely matching question, along with the provided metadata (e.g., links and sources), shorting the client device search for the answer.

For queries not matching prior FAQ question-answer pairs, the technical solutions can utilize a digital assistant or virtual assistant (VA) that the client device can access to generate a request (e.g., via an API call) to an ML model to generate an ML-based response and the summary of the answer to the user query, along with any metadata (e.g., citations and sources) identifying the location at which the response is found in the documents. The answer can then be provided to the client device (e.g., via the VA) or an enterprise practitioner (e.g., system admin) can review and edit the answer for accuracy and verification, prior to it being presented to the client device. The newly generated question-answer pair can be stored along with other question-answer pairs and mapped according to their respective embeddings to create relations with other question-answer pairs to provide a basis for future FAQ queries by the client devices.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
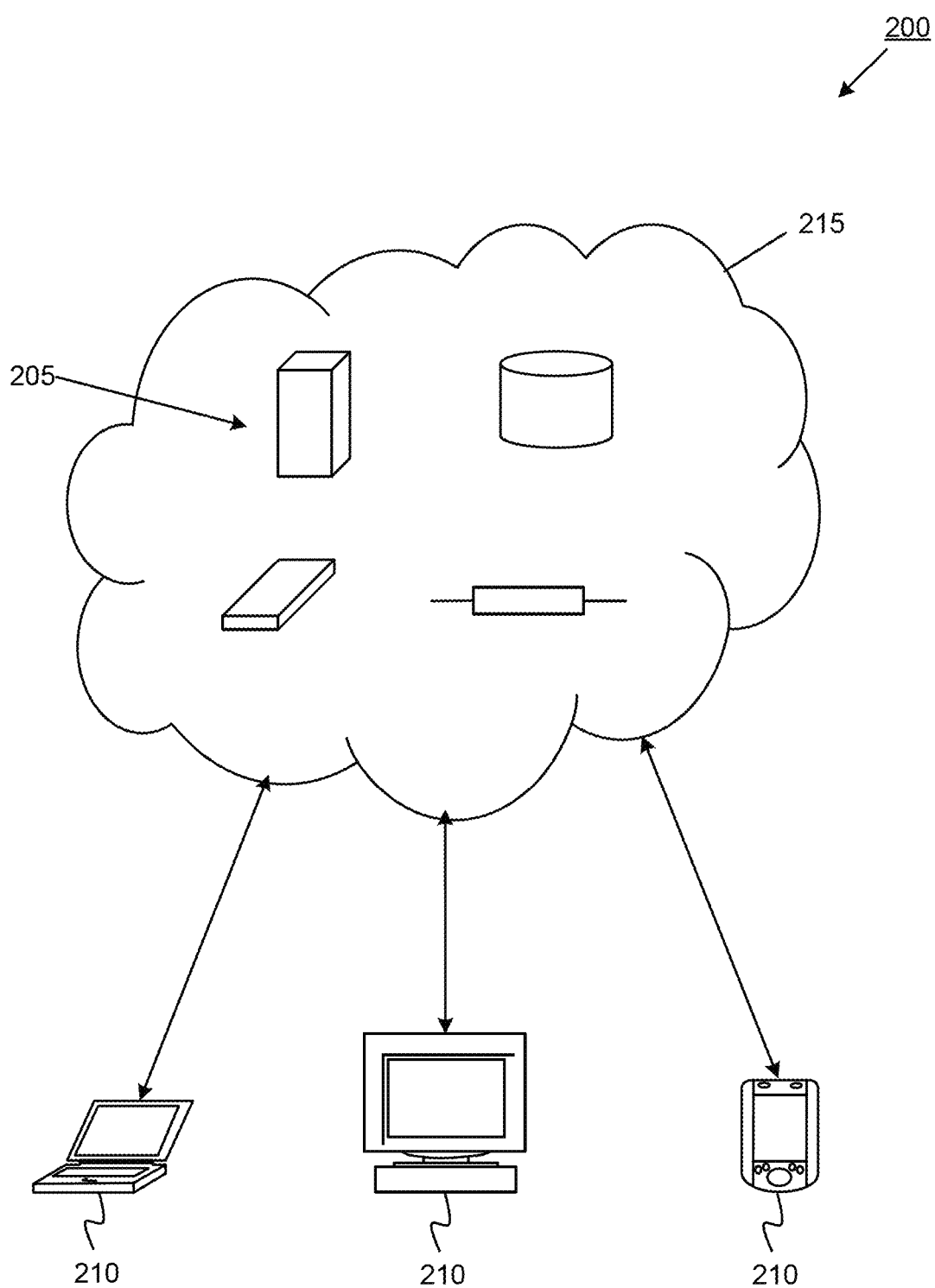
FIG. 2 shows an exemplary cloud computing environment in accordance with aspects of the present disclosure.

As shown in FIG. 1, computing system 100, which can be used to implement any aspects of the technical solutions, can include a computing device 105. The computing device 105 can be resident on a network infrastructure such as within a cloud environment as shown in FIG. 2 or may be a separate independent computing device (e.g., a computing device of a third-party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 115 provides an enterprise-wide security approach with all stakeholders (e.g., Dev teams, leadership, CSO office, etc.) with a set of various security scanner types and information sources integrated into a single tool. In embodiments, the processor 105 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 105 also establishes a regular feedback mechanism and can be used to develop a process for remediation timelines and priority including at risk vulnerabilities.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random-access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to integrate different scanner types into a single workbench or tool. This allows developers and other team members a uniform approach to assessing security vulnerabilities in a code throughout the enterprise. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure, and which can be used to implement any aspect of the technical solutions. In embodiments, one or more aspects, functions and/or processes described herein may be performed and/or provided via cloud computing environment 200. As depicted in FIG. 2, cloud computing environment 200 includes cloud resources 205 that are made available to client devices 210 via a network 215, such as the Internet. Cloud resources 205 may be on a single network or a distributed network. Cloud resources 205 may be distributed across multiple cloud computing systems and/or individual network enabled computing devices. Cloud resources 205 can include a variety of hardware and/or software computing resources, such as servers, databases, storage, networks, applications, and platforms that perform the functions provided herein including storing code, running scanner types and provided an integration of plural scanner types into a uniform and standardized application, e.g., display.

Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, an interface 315, such as a user interface (UI), can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
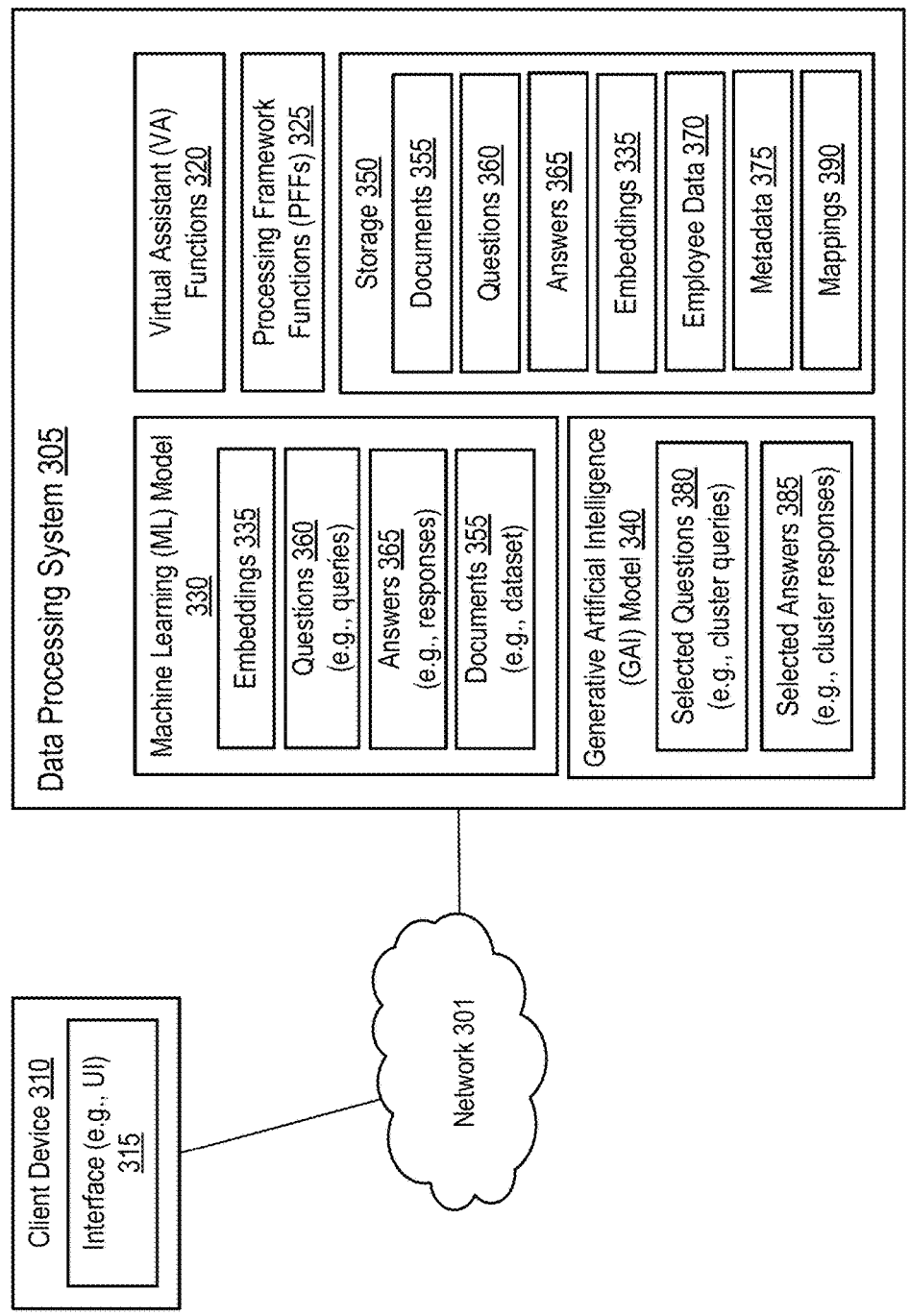
FIG. 3 shows an example block diagram of a system for providing ML-based generation of query-response pairs for processing framework of entities, in accordance with aspects of the present disclosure.

FIG. 3 shows an example 300 of a block diagram of a data processing system 305 for providing ML-based generation of query-response pairs for processing framework of entities. Example system 300 can include one or more client devices 310 communicating with a data processing system 305 via one or more networks 215 or 301. Client device 310 can include any computing systems or a device (e.g., computer, tablet or laptop) that can comprise or operate interfaces 315 for communicating with a data processing system 305. Data processing system 305 can include any one or more of virtual assistant (VA) functions 320 for interfacing with client devices 310 and receiving questions 360 (e.g., queries) and providing answers 365 (e.g., responses to the questions 360) to the client devices 310. Data processing system 305 can include one or more processing framework functions 325 for operating and managing one or more machine learning (ML) models 330 that can include, process, generate or utilize embeddings 335 (e.g., vector representations of questions 360, answers 365 or documents 355). Processing framework function 325 can operate and manage one or more generative artificial intelligence (GAI) models 340 that can select, match or identify the selected questions 380 and selected answers 385 based on incoming client queries or questions 360. Data processing system 305 can include one or more storages 350 (e.g., databases for storing information in data structures) which can include (e.g., store and provide access to) documents 355, questions 360 (e.g., queries) by client devices (e.g., users or employees of an enterprise), answers 365 for the questions 360 (e.g., responses to queries). One or more storage 350 can also store one or more of embeddings 335, client data 370, metadata 375 (e.g., markings or tags involving or referencing any documents 355, questions 360 or answers 365) and mappings 390 of questions 360 (e.g., cluster queries) and answers 365 (e.g., cluster responses).

System 300 can include the functionality for providing ML-based virtual assistance to entity employees (e.g., system users) for various processing or operational frameworks, including any enterprise or user-related rules, policies or guidelines with respect to HR or payroll services of employees. The data processing system 305 that can be deployed on a server or a cloud and which can be accessible by any number of client devices 310 via a network 301 (e.g., wired or wireless networks or internet connections or sessions for data communication). Data processing system 305 can be configured to allow an enterprise practitioner (e.g., a system admin) to load documents 355 (e.g., enterprise policy manuals, employee handbook, enterprise policies or decisions) that can be used to the ML model 330 and GAI model 340. For instance, processing framework functions 325 can include ML or AI model training functions or functionalities to train ML models 330 to generate embeddings 335 and provide or generate mappings 390, such as mappings of any combination of questions 360 and answers 365 (e.g., cluster queries or cluster responses). The data processing system 305 can utilize the processing framework functions 325 to use GAI models 340 to select or identify (e.g., based on input questions 360 or queries from the client device 310) any answers 365 (e.g., responses) to the client device query. The processing framework functions 325 can utilize the GAI model 340 to select the answer 365 of a question 360 from the storage 350 whose embeddings 335 most closely matches the embedding 335 of the incoming query or client device question 360, thereby providing the client device 310 a response 365 that is closest to the context or topic discussed in the incoming question 360 or client device request.

A client device 310 can be any computing device, such as a personal computer or a workstation that a user (e.g., employee of the enterprise) can use to access a virtual assistant function 320 of the data processing system 305 via an interface 315. The client device 310 can include one or more interfaces 315, such as a network interface (e.g., hardware interface for a network 301), or a user interface (UI) or a graphical user interface (GUI) of any computer executed application, such as a web browser. Interface 315 can include, for example a website, a web page, a GUI of an application or an agent for interfacing with a VA function 320 of a data processing system 305. Network interface 315 can include the functionality for implement any network interfacing, such as network communication via a network 301. UI or GUI type interfaces 315 can include a selection of menus and options that the user can access and use, via the client device 310, to send queries or requests that can include questions 360 to the data processing system 305. The queries or requests can involve any processing framework issue or a functionality, such as questions about operational rules or guidelines, information about entity or its employees or any other entity or client related data. The requests or queries from client devices 310 can include one or more questions 360 related to any enterprise rules policies, such as those reflected in the documents 355.

Data processing system 305 can include any combination of hardware and software for communicating via a network 301, such as any network interface 315. Network 301 can include any wired or wireless network, a world wide web, a local area network, a wide area network, a Wi-Fi network, a Bluetooth network or any other communication network or platform. Network 301 can include functionality for supporting communications using any network communication protocol such as Transmission Control Protocol (TCP)/Internet Protocol (IP), user datagram protocol (UDP), or any other communication protocol used for communicating over a network 301. Network interfaces 315 can include communication ports and hardware for receiving and sending data and messages over the network 301.

Virtual assistant (VA) functions 320, also referred to as the virtual assistant 320 or VA 320, can include any combination of hardware and software allowing the user to interact with the data processing system 305. VA 320 can include or be integrated with an interface 315 or can be accessed via UI or GUI portion of an interface 315, such as via an application or an agent function. VA 320 can include ML or AI-powered functions or tools, including any integrations to utilize any functionality of GAI models 340 or ML models 330. VA 320 can allow client devices 310 (e.g., enterprise employees) to send queries (e.g., questions 360) and receive responses (e.g., answers 365) relating any processing framework of the entity, such as any operational of processing tasks for implementing HR or payroll policies and practices, or any other computational or data processing related tasks.

VA 320 can leverage ML model 330 and/or GAI model 340 that are trained using a dataset of documents 355. The dataset for training ML model 330 or GAI model 340 can include any collection of documents 355, including enterprise policy or taxation documents, employee handbooks, guidebooks or policies, or any other entity related information. Documents 355 can include various comprehensive and up-to-date information in the form of answers 365 or selected answers 385 for various questions 360 or selected questions 380. Documents 355 can include textual information from which the ML model 330 or GAI model 340 can infer processing frameworks (e.g., steps for filling out taxes, calculating deductions for a payroll for an employee, allowing or denying access to materials or data based on employee status or level or determining the availability of particular benefits. Client devices 310 (e.g., users) can provide queries or questions 360 on various HR-related topics, such as employee benefits, leave policies, or company regulations. VA 320 can utilize the knowledge base from the ML model 330 and/or GAI 340 to generate or summarize (e.g., provide concise versions of) accurate and reliable responses 365.

Processing framework function 325, also referred to as a PFF 325, can include any combination of hardware and software for providing responses (e.g., selected answers 385) to client device queries (e.g., 360). user queries (e.g., 360) and providing ML or AI generated managing the data processing system 305. Processing framework function 325 can include the functionality for the system admin to input into the storage 350 documents 355 which can include company policies, employee handbooks, health benefits, enterprise policies and all other information or data that can include information about HR related issues for the employees. Processing framework function 325 can allow the system admin to train the ML models 330 or GAI models 340 using a dataset. The dataset can include any combination of documents 355, questions 360, answers 365, selected question 380 or selected answers 385.

Client queries 360, also referred to as requests 360, can include any queries or questions from client devices 310 regarding any processing framework. Client queries or requests 360 can include any text or strings of characters involving or including questions on various rules or policies, any guidelines or procedures, or any operational or computational details pertaining to operations of an entity (e.g., enterprise) or services provided to employees of the entity, such as HR services, payroll services, health benefits services or any other services.

Responses or answers 365 can include any responses or answers provided to the client queries or requests. Responses or answers 365 can include any text or string of characters providing answers, responses or explanations for the issues raised in the queries or questions from the client device 310. Answers 365 can include summaries or documents or derivations of explanations from documents 355 that can be generated by the processing framework function 325 using ML model 330 or GAI models 340. Answers 365 can provide information or data providing processing or computational information, such as, amounts of assets (e.g., holidays, vacation days, personal time off, benefits, refunds, payroll payments or any other numerical values to be processed by data processing system for providing services to employees or clients). Answers 365 can include or provide information about whether a client (e.g., employee) is allowed particular access to access (e.g., benefits, refunds, personal time off, or similar).

Questions 360 and answers 365 can refer to various details and snippets of policies, rules, guidelines or instructions for employees, which can be general (e.g., laws or regulations for entire territories or areas) or personalized with respect to particular group of employees or individual employees. Questions 360 and answers 365 can incorporate or depend on client data 370 that can include employee's personal information (e.g., data in an electronic account associated with a unique identifier of a user, health records, financial data or any other user-specific information. Questions and answers 365 can be generated by the ML 330 and/or GAI 340 according to various details from the documents 355.

Processing framework function 325 can include any functionality (e.g., computer code, instructions or data) for generating and providing responses to user queries. Processing framework function 325 can collect and stored, over time, questions 360 and answers 365 received by the data processing system 305 from various clients 310. Processing framework function 325 generate or create embeddings 335 for the questions 360 or answers 365, using for example, ML model 330. The processing framework function 325 can generate mappings 390 for the questions 360, answers 365 or any combination of questions 360 and answers 365, based on the embeddings 335.

The processing framework function 325 can generate create, generate, select or identify clusters of questions 360, clusters of answers 365 or clusters of any combination of questions 360 and answers 365. The clusters of questions 360 or answers 365 can be mapped in a vector space or embedding space based on the mappings 390 and can identify contextual groupings or similarities and differences between various groups or types of questions or queries, or responses or answers. The processing framework function 325 can generate selected questions 380 to serve to the client device 310 in response to incoming question 360. For instance, the processing framework function 325 can utilize ML model 330 or GAI model 340 to select, based on the contextual similarity between the incoming query (e.g., question 360) and a selected question 380 (e.g., cluster question selected from a cluster of questions 360), a selected answer 385 to serve responsive to the incoming query or question 360. For example, the processing framework function 325 can utilize GAI model 340 to compare the mapping (e.g., vector space of the cluster questions 360 or 380) to identify the closest cluster question for the incoming client device query or question 360. The selected answer 385 associated with the cluster question (e.g., 360 or 380) can be selected by the processing framework function 325 to be served (e.g., via VA 320) to the client device 310.

Processing framework function 325 can include the functionality for training ML 330 and/or GAI 340. For instance, processing framework function 325 can include the functionality for preprocessing of the documents 355, such as document extraction, breaking of documents into chunks, creating text corpuses of chunk data. Processing framework function 325 can include the functionality for creating embeddings 335, encoding text to embeddings and storing the embeddings 335 as vector representations of various data chunks of any one or more of: the documents 355, questions 360 or answers 365. Processing framework function 325 can allow the system admin to review questions 360 and answers 365 proposed by the ML model 330 to be selected as the cluster questions and cluster answers. This determination or selection can be done in view of the mapping 390 (e.g., vector space distribution of embeddings 335 for questions 360 or answers 365) along with any information from a dataset (e.g., documents 355). Such selected proposed cluster question and answer pairs can be curated or permitted for storage based on the system admin selections (e.g., system admin analysis of the selections or any edits to the questions or the answers). Processing framework function 325 can utilize client data 370 that can include personalized user information to provide personalized answers 365 to questions 360 specific to the particular user.

Machine learning (ML) model 330 can be any computational system or algorithm that can learns patterns from data (e.g., chunks of data from documents 355) and makes predictions or performs tasks without being explicitly programmed to perform such tasks. ML model 330 can be configured to generate embeddings 335 for questions 360, answers 365 or documents 355. ML model 330 can map the embeddings 335 for the questions, answers or dataset in mappings 390 corresponding to vector spaces of the questions, answers or dataset.

ML model 330 or GAI model 340 can each be trained using a dataset of documents 355, including employee handbooks, policy manuals, or company guidelines or policies and/or client data 370. ML model 330 or GAI model 340 can be designed to understand and extract relevant information from documents 355, enabling the data processing system 305 to receive employee questions on HR-related topics and provide accurate answers based on its training. ML model 330 or GAI model 340 can leverage natural language processing techniques and pattern recognition to comprehend the context and intent of the employee's question, match it with relevant information in the training data, and generate a response that addresses the query.

ML model 330 can be trained (e.g., using documents 355 or metadata 375) to convert text data from the questions 360, answers 365 or documents 355 into numerical representations (e.g., embeddings 335) of the chunks of those respective questions, answers or documents. The metadata 375 can include any information or data about the documentation sources, selected responses or selected queries. Metadata 375 can include identifiers, titles or names of documents used, author data, publication date indicating the publication or last update date of the document. Metadata 375 can include keywords or tags associated with the document content, a summary or abstract of the document's content. Metadata 375 can include links for sources of information within the document, such as a citation (e.g., page or paragraph within document for a particular quote or information used), or any other information corresponding to the documents connected with any selected queries or selected responses, or vice versa. Using the metadata 375 or any other information, embeddings 335 can capture the semantic meaning of words, paragraphs, pages or sentences, depending on the size and type of chunks of data documents 355 are parsed into. Embeddings 335 can be used to represent and organize the documents 355 within a high-dimensional space (e.g., embedding space or mapping 390).

Mapping 390, which can also be referred to as the embedding space, can include a space or vector diagram in which chunks of data can be plotted based on their vector representations of concepts. Mapping 390 (e.g., embedding space) can allow similar concepts, ideas or texts pertaining to any topic (e.g., questions 360, answers 365 or documents 355) to be mapped, plotted or located closer together than those concepts or texts that are less similar or dissimilar. Embedding space (e.g., mapping 390) can include a multi-dimensional vector space where each data point is represented by an embedding 335 of a particular question 360, answer 365 or document 355.

Mappings 390 can include an embedding space for questions 360, in which plots of contextual representations of historical queries from various client devices 310 can form clusters (e.g., clusters of questions 360) based on various topics or content. When preparing or generating FAQ services, the process framework function 325 can select cluster questions 380 from a larger plurality or pool of historical questions 360, such that each selected question 380 represents a particular cluster of questions 360 from the larger plurality or pool of historical questions 360. Using such clustering and mapping approach, the processing framework functions can cover the entire mapping 390 (e.g., embedding space) of the historical questions 360 using a number of cluster questions (e.g., select questions 380).

For example, the processing framework function 325 can plot a group of a thousand questions 360 on a mapping 390 using embeddings 335 of each of the questions 360. Based on the plotting of the vector representations (e.g., embeddings) of each of the questions 360 in the mapping 390, the processing framework function 325 can identify clusters of the questions 360 (e.g., 500 clusters of groups of questions 360 in the vector or embedding space). The processing framework function 325 can generate, for each of the clusters of questions 360, a representative selected question 380 of that cluster of questions 360. Accordingly, the processing framework function 325 can represent the entire mapping 390 (e.g., embedding space) of a thousand questions 360 by using 50 selected questions 380 for which the processing framework function 325 can utilize the GAI model 340 or the ML model 330 to generate corresponding select answers 385 to provide.

For example, when a client device 310 sends a new question 360 (e.g., query) about a processing framework (e.g., policy of an enterprise) the processing framework function 325 can utilize the ML model 330 to generate an embedding of the new question 360 and compare the embedding of the new question 360 against embeddings 335 in the mapping 390 (e.g., vector space with the clusters of questions 360 mapped based on their contextual representations). The processing framework function 325 can then utilize the ML model 330 to identify one or more of the selected questions 380 (e.g., cluster question) that are closest in terms of their contextual representation on the embedding space to the new question 360. The processing framework function 325 can then select the one or more selected answer 385 corresponding to the one or more selected questions 380 to provide, via VA 320, to the client device 310.

The processing framework function 325 can utilize ML training to train the ML model 330 to learn to map the embeddings 335 to any issues or topics (e.g., questions, answers, documents or any other data). This can be implemented by creating embedding space for any dimensions of any issues or topics (e.g., questions 360, answers 365, documents 355) and using any metadata 375. Metadata 375 can include any information or data about any document source, including any page numbers, paragraph numbers, line numbers, selection of characters, date of the document, sources or links, author of the document, dates of updates, creation or adjustments, or any other data). When updates to the documents 355 are made or provided, the processing framework function 325 can utilize metadata 375 for the questions 360, answers 365, documents 355, selected questions 380 or selected answers 385 to regenerate only those selected questions 380 and selected answers 385 that were updated, while not retraining those selected questions 380 or selected answers 385 whose underlying or source documents 355 were not changed.

The processing framework function 325 can utilize ML training to train the ML model 330 to learn to map the embeddings 335 to HR-related issues, such as question answering or document classification, by adjusting its internal parameters. Internal parameters can include numerical values of the ML model 330 that the model learns and adjusts during training to optimize its performance and make accurate predictions. Such training can include iteratively presenting the various documents 355 (e.g., or their chunks, embeddings 335) to the ML model 330, comparing its predictions with the known correct answers, and updating the model's parameters to minimize the prediction errors. By learning from the embeddings 335 of the documents 355, the ML model 330 can gain the ability to generalize its knowledge and make accurate predictions or provide relevant insights when presented with new HR-related inputs or questions.

Generative artificial intelligence (GAI) model 340 can include any ML or AI model or a system that can learn from a dataset (e.g., documents 355) to generate new content (e.g., text or images) that resembles a distribution of the training dataset. A distribution of a dataset can include an underlying probability distribution representing the patterns and characteristics of the data used to train an ML model. For example, a training data distribution can represent statistical properties of a text data (e.g., text corpus), such as the frequency of words, the co-occurrence of terms, and the overall structure of the language used in the training dataset (e.g., documents 355). GAI 340 can include the functionality to utilize such a probability distribution of patterns and characteristics to generate new responses (e.g., predictions) that were not present in the dataset.

GAI model 340 can receive user inputs or questions and assess whether they match specific questions 360 stored in a storage 350 and generated by a ML model 330 or GAI model 340 which have been curated and approved by a system administrator. ML model 330 and/or GAI model 340 can leverage its training on a diverse dataset (e.g., large number of various documents 355) to understand the context and semantic meaning of the user's input. By comparing the user's question from the user's request or query with the stored questions 360, the ML model 330 and/or GAI model 340 can determine if there is a correspondence or similarity. Once a potential match is identified, the generated response or answer 365 can be curated and validated by a system administrator before being provided to the user, ensuring accuracy and reliability. This process enables the data processing system 305 to effectively address user inquiries by retrieving and delivering approved answers from the ML model's curated question-answer knowledge base. Generative Artificial Intelligence (GAI) model 340 can include any machine learning (ML) or artificial intelligence (AI) model designed to generate content or new content, such as text, images, or code, by learning patterns and structures from existing data. GAI model 340 can be any model, a computational system or an algorithm that can learn patterns from data (e.g., chunks of data from various input documents, computer code, templates, forms, etc.) and make predictions or perform tasks without being explicitly programmed to perform such tasks. GAI model 340 can refer to or include a large language model. GAI model 340 can be trained using a dataset of documents (e.g., text, images, videos, audio or other data). GAI model 350 can be designed to understand and extract relevant information from the dataset. GAI model 340 can leverage natural language processing techniques and pattern recognition to comprehend the context and intent of the prompt, match it with relevant information in the training data, and generate a response that addresses the query.

GAI model 340 can be built using deep learning techniques, such as neural networks, and can be trained on large amounts of data. GAI model 340 can be designed, constructed or include a transformer architecture with one or more of a self-attention mechanism (e.g., allowing the model to weigh the importance of different words or tokens in a sentence when encoding a word at a particular position), positional encoding, encoder and decoder (multiple layers containing multi-head self-attention mechanisms and feed-forward neural networks). For example, each layer in the encoder and decoder can include a fully connected feed-forward network, applied independently to each position. The data processing system 305 can apply layer normalization to the output of the attention and feed-forward sub-layers to stabilize and improve the speed with which the GAI model 340 is trained. The data processing system 305 can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer.

GAI model 340 can be trained (e.g., by a model training function) using any text-based dataset by converting the text data from the input dataset documents into numerical representations (e.g., embeddings) of the chunks of those documents. These embeddings can capture the semantic meaning of words, paragraphs, pages or sentences, depending on the size and type of chunks of dataset documents are parsed into. Embeddings can be used to represent and organize the dataset documents within a high-dimensional space (e.g., embedding space), where similar documents or concepts are located closer together. Embedding space can include a multi-dimensional vector space where each data point is represented by an embedding.

Through training, the GAI model 340 can learn, or adjust its understanding of mapping the embeddings to particular issues (e.g., particular types of template outputs, particular form related functionalities, placeholder and variable relations and more), by adjusting its internal parameters. Internal parameters can include numerical values of the GAI model 340 that the model learns and adjusts during training to optimize its performance and make more accurate predictions. Such training and can include iteratively presenting the various data chunks or documents of the dataset (e.g., or their chunks, embeddings) to the GAI model 340, comparing its predictions with the known correct answers, and updating the model's parameters to minimize the prediction errors. By learning from the embeddings of the dataset data chunks, the GAI model 340 can gain the ability to generalize its knowledge and make accurate predictions or provide relevant insights when presented with prompts (e.g., requests).

Generative artificial intelligence (GAI) model 340 can include any ML or AI model or a system that can learn from a dataset to generate new content (e.g., text or images) that resembles a distribution of the training dataset. A distribution of a dataset can include an underlying probability distribution representing the patterns and characteristics of the data used to train a GAI model 340. For example, a training data distribution can represent statistical properties of a text data (e.g., text corpus), such as the frequency of words, the co-occurrence of terms, and the overall structure of the language used in the training dataset. GAI model 340 can include the functionality to utilize such a probability distribution of patterns and characteristics to generate new responses (e.g., predictions) that were not present in the dataset.

ML 330 and GAI model 340 can be designed as, or be, large language models (LLMs). An LLM can include an artificial intelligence system designed to understand and generate human-like text in natural language. An LLM can be built using deep learning techniques and trained on amounts of textual data that can include millions or billions of sentences or paragraphs and include between a ten gigabytes and hundreds of terabytes of data from diverse sources, such as books, articles, and websites. By capturing patterns, relationships, and context from the training data, an LLM can acquires a rich understanding of language, grammar, and semantics. An LLM can be capable of performing a wide range of language-related tasks, including text completion, question-answering, translation, summarization, and creative writing. LLMs can generate coherent and contextually appropriate responses based on the input provided. The scale that can characterize a Large Language Model (LLM) can refer to the number of parameters or weights the model possesses. LLMs can include millions or even billions of parameters, which can allow the LLM to capture and learn intricate language patterns, nuances, and semantic relationships from massive amounts of training data. This extensive parameter count can enable the model to exhibit advanced language understanding capabilities, generate coherent and contextually relevant text, and perform a wide range of language-related tasks with improved accuracy.

Embeddings 335 can include any numerical representations of words, sentences, or other data entities that capture semantic meaning and relationships of such data entities (e.g., chunks) in a high-dimensional space (embedding space or mapping 390). Embeddings 335 can be applied to questions, answers, documents, cluster questions, cluster answers or any other data. Embeddings 335 can be generated or learned through an embedding model (e.g., ML model 330), which can map the original data into a continuous vector space where similar data entities (e.g., contextually similar data chunks) can be located or mapped closer together with respect to each other. By similarity functions (e.g., cosine similarity or Euclidean distance) the embeddings 335 of different data chunks (e.g., questions or answers) can be compared to identify most similar or suitable ones. The embeddings 335 can capture the contextual and semantic information of the data entities allowing ML model 330 to understand the inherent meaning and relationships between these data chunks (e.g., words, sentences, paragraphs or pages). In doing so, embeddings 335 can allow allows the models (e.g., ML 330 and/or GAI 340) to perform tasks such as natural language processing, sentiment analysis, similarity search or recommendation systems, as they can utilize the learned embeddings 335 to encode and process textual information with respect to the meaning of that information.

When a user sends a request for a question that is not yet generated by the ML model 330 and therefore not found among questions 360 or selected questions 380 stored in the storage 350, GAI model 340 can utilize the probability distribution with respect to the input data (e.g., from the user's request) to provide a selected answer 385. The selected answer 385 can be a cluster answer to a cluster question (e.g., selected question 380) that represents a cluster of questions 360 mapped on the mapping 390 embedding space and that is closest (e.g., in terms of the Euclidean distance or cosine similarity) to the embedding 335 of the incoming client device query received via the VA 320 (e.g., the chatbot).

For example, a processing framework function 325 can determine that a user's incoming question 360 is not related to any of the questions 360 in the storage 350. This can be done by determining the embedding 335 of the incoming query and determining that the embedding 335 of a closest cluster question 380 is more than a predetermined threshold distance away from the embedding of the incoming question 360 (e.g., the most similar cluster query-response pair is too dissimilar from the incoming query). In response to such a determination, GAI model 340 can use text of the incoming request or the embedding 335 of the incoming request to generate a new cluster or selected answer 385. VA 320 can then provide the selected answer 385 to the client device 310 (e.g., via VA 320 and the UI 315). For instance, the VA 320 can send the selected or predicted answer 385 to the UI 315 of the system admin to request the admin approval (e.g., curating), and then, once curated, it can send the curated predicted answer 385 to the client device 310. Such a curated selected answer 385 can be stored as the selected answer 385 in the mapping 390 or as an answer 365.

For example, GAI model 340 can generate selected questions 380 and selected answers 385 in response to generating one or more selected questions 380 that do not correspond to and are not found among the questions 360. For example, GAI 340 can identify or generate a particular question (e.g., using its probability distribution) that a user may ask in the future, but that was not yet asked or was not yet generated by ML 330. In response to determining that such a generated question is unlike (e.g., does not match or correspond to) any questions 360, this question can be a predicted or selected question 380 and used as a cluster query. GAI model 340 can then utilize its probability distribution to generate a predicted or selected answer 385 to the predicted or selected question 380. The predicted question 380 and predicted answer 385 can then be sent to the system admin to request the admin to review and curate the predicted question/answer pair. Once curated, edited (if necessary) and approved, the predicted question 380 can be stored into storage 350 as a question 360 and the predicted answer 385 can be stored as an answer 365.

Figure 4:
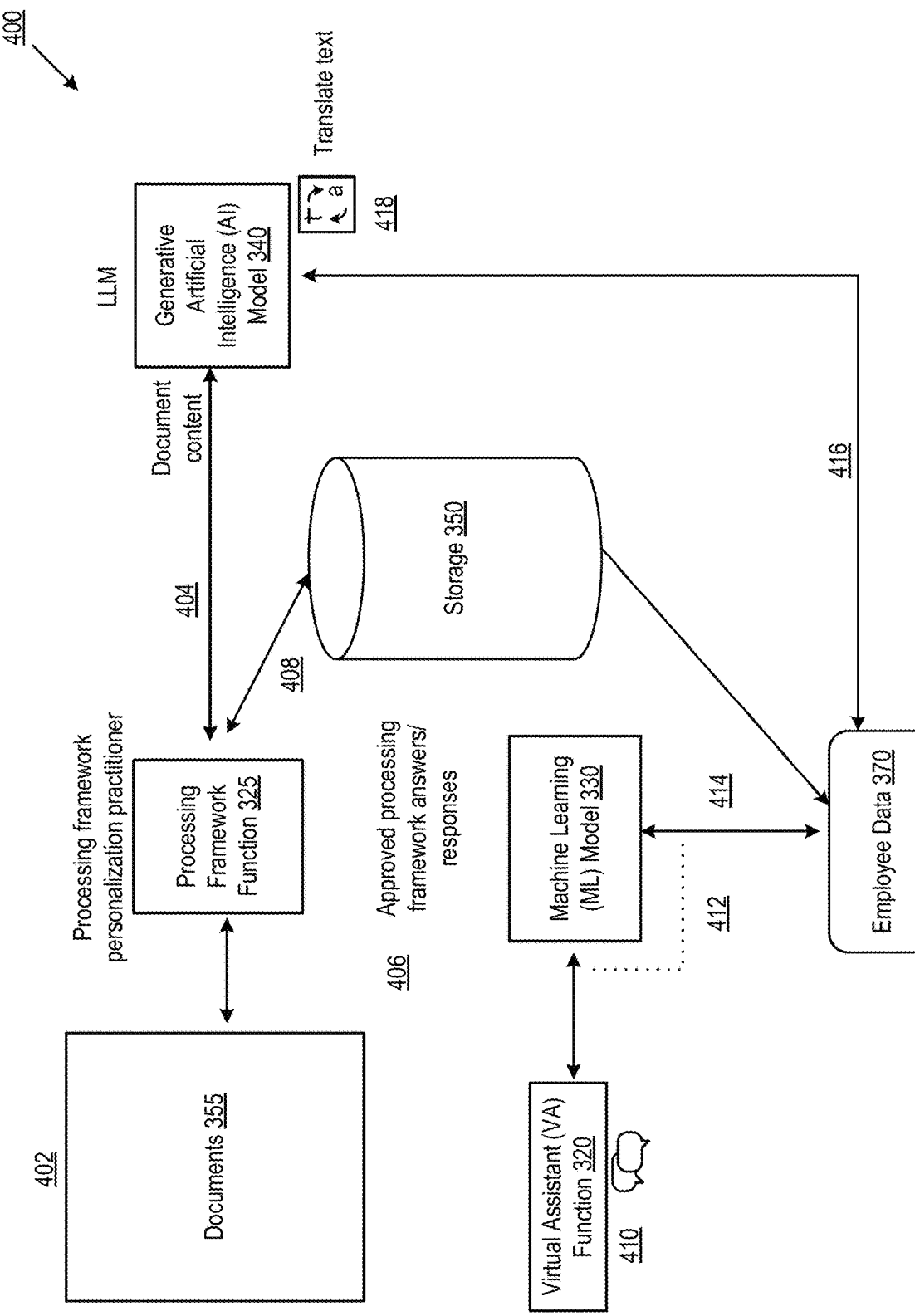
FIG. 4 shows an example process flow for providing ML based enterprise policy virtual assistance to enterprise employees, in accordance with aspects of the present disclosure.

FIG. 4 shows an example of a process flow 400 for providing ML-based entity processing framework (e.g., enterprise policy) virtual assistance to client devices (e.g., user or employees) using a data processing system 305. The process flow 400 can be implemented using the system tools, devices and components discussed herein, including for example in FIGS. 1-3. The technical solutions can provide a VA 320 to a user to allow the client device 310 (e.g., a user, such as an employee) to use data processing system 305 (e.g., ML models 340 or GAI models 340) to search and source accurate, clear, and concise summaries of client queries or questions about processing framework (e.g., policies, rules, procedures, processes or guidelines of an enterprises). Process flow 400 can include acts or operations 402-418.

At 402, a client administrator can ask the data processing system 305 to generate potential answers to enterprise policy question using the client policy documents collection (e.g., documents 355) from the client's SoR as input. One or more answers 365, such as a list of answers 365, can be generated by using ML 330 or GAI 340. ML 330 or GAI 340 can also generate a list of additional selected questions 380 which may be used to provide selected answers 385 for the incoming client requests, other than the existing questions 360 that are already in the data processing system 305. ML model 330 or GAI 340 can generate selected answers 385 for the selected questions 380.

At operation 404, the generated selected answers 385 can be returned to the client application (e.g., UI 315 of the system admin's client device 310) and can be presented to the client admin for curating or approval. At this point, the system admin can edit and approve the questions and answers.

At operation 406, the system admin can approve and publish the selected questions 380 and selected answers 385 for use by VA 320. The published selected questions can correspond to cluster queries, each of which can include a query selected or generated in a center of a cluster of a group of questions in an area or a region of a mapping (e.g., embedding space of the cluster). The published selected responses can include ML-generated responses, for the selected (e.g., cluster) questions. The published query-response pairs (e.g., cluster queries and cluster responses) can represent the group of queries and responses of the cluster and can be provided in response to any future incoming queries whose embedding falls within the embedding space of the cluster.

At 408, data processing system 305 can store the selected questions 380 and selected answers 385 in storage 350 as cluster questions and cluster answers. Stored selected questions 380 and stored selected answers 385 can be stored as selected questions 380 and selected answers 385 or as questions 360 and answers 365 corresponding to a particular embedding space (e.g., embedding space of the cluster that they represent). For example, the selected questions 380 and selected answers 385 can be stored as questions 360 and answers 365 in a database of the storage 350 for ease of access in future user requests.

At 410, a client device 310 (e.g., a user or an employee) can enter a query, via a VA 320, asking a question 360 on a particular processing framework (e.g., an HR or a payroll related matter), such as for example, a company policy or regulation. For instance, a user can ask the VA 320 a company policy question, such as "how much sick time do I get each year?", or "what health benefits do I have."

At 412, a VA 320 can generate an API call to a processing framework function 325 to request the appropriate answer to the employee's question. The API call can trigger the processing framework function 325 to seek the answer to the user's question among the data stored in storage 350. The processing framework function 325 can have, in its storage, any number of cluster questions and cluster response pairs (e.g., 380 and 385 pairs) covering the mapping 390 (e.g., embedding space of the questions 360). The processing framework function 325 can utilize one or more ML models 330 or GAI models 340 to generate an embedding 335 for the incoming client question, compare the embedding 335 of the incoming client question against cluster questions in the mapping 390 (e.g., embedding space) to identify the closest or most similar cluster or selected question 380 and its corresponding selected answer 385 (e.g., based on a similarity function between the two embeddings)

At 414, VA 320 or the processing framework function 325 can utilize the ML model 330 or GAI model 340 to respond to the user with a selected answer 385 that was previously curated and stored in storage 350. The processing framework function 325 can refer to employee data 370, or any other data (e.g., metadata 375) when generating or selecting the response.

As 416, in order to provide the selected response 385 in response to the incoming user query (e.g., when a most similar cluster question is too dissimilar from the incoming question), the data processing system 305 can utilize the ML model 330 or GAI 340 in order to generate the select questions 360 and responses 365 that may or may not be previously approved by the system admin.

As 418, the technical solutions can utilize Generative AI model 340 to translate these the queries (e.g., questions) from the user to match them with the most similar questions 360 in the storage 350. Once a match (e.g., within a particular threshold range) is identified, the user question from the user request can be identified with the particular matching question 360 or select question 380 in the storage 350 and the answer 365 or select answer 385 corresponding to the particular questions can be provided to the user in response.

The technical solutions can utilize API to generate questions 360 and answers 365 based on the client's policy documents 355. For example, the technical solutions can call an API to generate the questions 360 and answers 365 using the client's own policy documents 355 as the source material or training material. The resulting summary of the policy (e.g., answer 365) would then be presented to the system admin (e.g., client practitioner), allowing them to make any adjustments before saving and approving the answer 365 for publication and use by VA 320 to answer employee questions. This can allow the system to quickly generate an accurate, concise answer while also allowing the enterprise admin to review and apply editorial discretion, and while also removing the risk that API response may return an incorrect or incomplete answer directly to a client employee. In addition, this would allow for clients to identify additional questions that employees may ask.

The technical solutions can also have the benefit of reducing the API calls to use. For instance, in some implementation the API may be used only to generate the initial answer (which would then be stored), rather than calling the function with an API each time a question is asked. The technical solutions can also use the GAI 340 to translate the questions/answers in the languages approved by the system admin.

The technical solutions can have the data processing system 305 that can be deployed or given access to a variety of customer sites (e.g., variety of entities or enterprises). These individual instances of data processing systems 305 can allow sharing of data (e.g., collect data from data processing systems 305) to allow further training and improvement of the ML model 330 and/or GAI 340 to generate more accurate answers. Accordingly, documents 355 can include the source material, the question, the results, as well as the human-edited and approved final product from all of the sites, allowing their storage in a central location for training of the ML model 330 and/or GAI 340.

Figure 5:
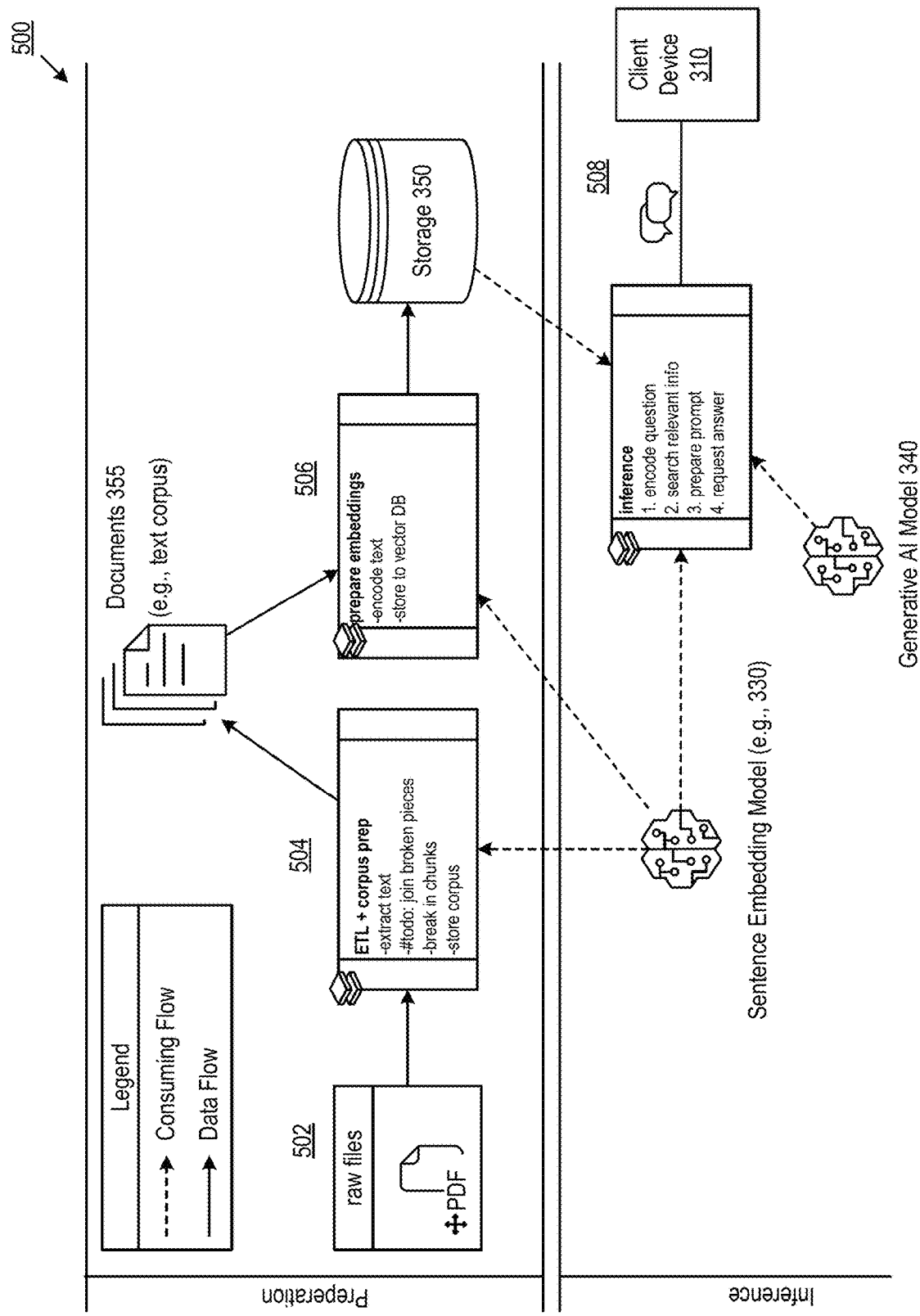
FIG. 5 shows an example process flow for training the ML model and the generative AI model to perform enterprise policy virtual assistance to enterprise employees, in accordance with aspects of the present disclosure.

FIG. 5 shows an example process flow 500 for training the ML model 330 and the generative AI model 340 to perform enterprise policy virtual assistance to enterprise employees, in accordance with aspects of the present disclosure. The process flow 500 can be implemented by the data processing system 305 and in accordance with any features or techniques discussed herein, including FIGS. 1-4. The process flow 500 can be implemented using acts or operations 502-508

At 502, the process flow 500 can start with accessing of raw files (e.g., documents 355) that can be provided for training of ML model 330 or GAI model 340. The raw files can be provided in a PDF format, or MS Word format or any other format and can correspond to any processing framework discussed herein.

At 504, preprocessing of data can be implemented, using for example, the processing framework function. For instance, the processing framework function can implement data extraction, transform and loading (ETL), which can be performed in order to prepare the text corpus. The ETL can include extracting data from different sources, transforming the data into a consistent format, and loading it into data processing system. The extraction phase can include gathering raw data from various sources, while the transformation phase can process and modify the data to meet specific requirements. The loading phase can include loading the transformed data into a target system for analysis. Corpus preparation can focus on organizing and preparing a collection of text documents, involving steps such as gathering the documents, cleaning and preprocessing the text, and optionally annotating or labeling portions of the corpus for specific analysis purposes.

At 506, after performing the ETL process on the text data, the data processing system can utilize the ML models to prepare embeddings 335 to encode the processed text into embeddings or vectors, which can be stored a vector database (e.g., in a database of a storage 350). This process can include word, sentence or paragraph embeddings to convert the textual information into numerical representations. For instance, word embeddings can capture the meaning of individual words, while sentence embeddings can encapsulate the semantic meaning of entire sentences or paragraphs. Embeddings can serve as dense vector representations of contextual relationships and semantic similarities within the text. Once stored, embeddings can allow for fast and effective querying and analysis of the text data, as the embeddings can retain the underlying semantic information and provide a compact representation of the original text for various downstream tasks like information retrieval, recommendation systems, or clustering.

At 508, a user at a client device can input a textual question into the virtual assistant and the Generative AI model can leverage the user's input text as input question. The question can be encoded using embeddings, which can capture the semantic meaning of the text from the user's question. The encoded question can then be used to prepare a prompt, which serves as the input for the model to generate a response or answer. The GAI model can make an inference based on the query or the prompt, taking into account the learned patterns and information from the training data to identify the matching question, such as a cluster question whose embedding is closest in terms of Euclidean distance to the embedding of the incoming request. By identifying the matching question already stored in the database, the model can identify the cluster answer corresponding to the cluster question and provide the user with the selected answer in response to the user's question. The selected answer can include metadata (e.g., links to source documents in the dataset or documents) offering assistance to the user at the client device along with additional information. The response can then be provided to the user in the form of the response to the user's inquiry via a virtual assistant or a chatbot.

FIG. 6 shows an example 600 graphical user interfaces 315 for implementing a processing framework function, in accordance with aspects of the present disclosure. The example 600 of interface 315 (e.g., GUI) can include a web page allowing a user or a system administrator to identify locations of the documents 355 to be used for training of the ML model 330 and/or GAI 340 and also identifying any other user information. The UI 315 can also include a page or a window for reviewing, curating and editing the responses 365 prior to their storage. The US 315 can include metadata on each question 360 and answer 365 pair, such as the date when the question and answer were published and a duration of the pair.

Figure 7:
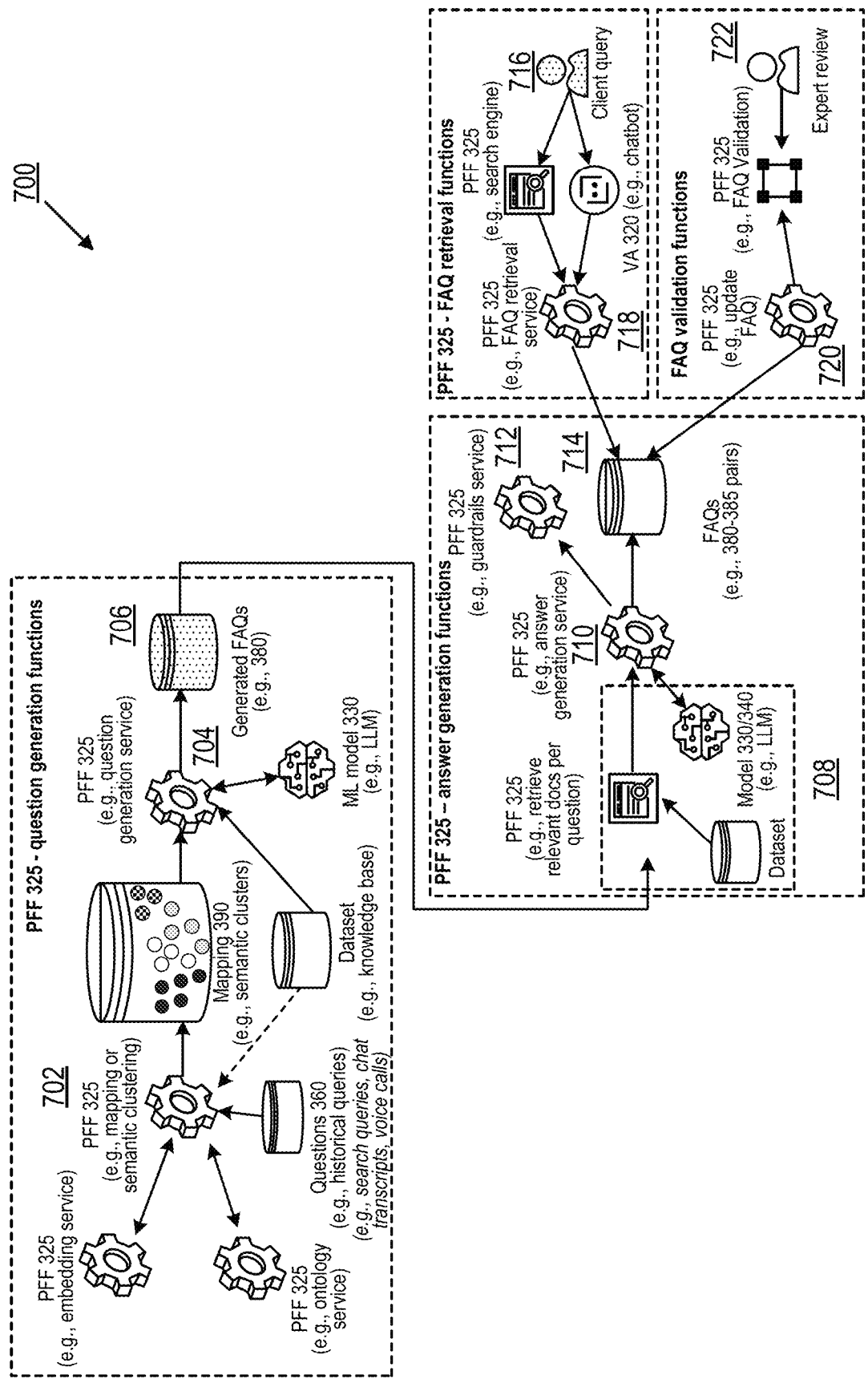
FIG. 7 shows an example process flow for providing ML-based frequently asked questions (FAQ) services for processing frameworks of an entity.

FIG. 7 shows an example process flow 700 for providing ML-based FAQ services for processing frameworks. The process flow 700 can be implemented by the data processing system 305 and in accordance with any features or techniques discussed herein, including any features, acts or operations discussed in connection with FIGS. 1-6. For instance, the process flow 700 can be using any features of a system 300, such as a data processing system 305 implemented using processors 115 coupled with memory (e.g., 120 or 125) and utilizing stored instructions, computer code or data to perform or implement acts or operations 702-722.

At 702, a processing framework function (PFF) can utilize data on historical questions gathered from a plurality of client devices 310 over a time period in order to generate mapping 390 of the questions and identify question clusters. The PFF can utilize, for example, its embedding service functions to employ ML model 330 to generate embeddings for the historical questions. The PFF can utilize its ontology service functions and the dataset (e.g., documents of the dataset) to gather information or data from documents or contextual information about the questions. The PPF function can utilize its mapping or semantic clustering services to generate mapping of the historical questions.

The mapping generated at 702 can include vector representations (e.g., embeddings) of each of the questions in an embedding space. The plotting can be multi-dimensional and can utilize any number of values representing any tokens pertaining to words or phrases of questions gathered over a period of time (e.g., past one or more months or one or more years). The PFF can generate the mapping that can include clusters of questions, such that each of the plurality of clusters can center around a central contextual or semantic point in the embedding space. As shown in the mapping of the FIG. 7, mapping can be represented using color coded grouping of points in a two-dimensional plot or a space, each color code representing questions of a different cluster (e.g., semantic or contextual grouping).

At 704, PFF can utilize its question generation service to generate questions using the mapping 390. For instance, the PFF can utilize ML model to identify a plurality of clusters of questions at the mapping of the questions. For instance, the PFF can generate a central location of each of the clusters (e.g., a point at an embedding space of the mapping around which the group of questions forming a cluster are centered). The PFF can utilize the ML model to identify the representative question for each cluster (e.g., cluster query or a cluster question).

At 706, the PFF can store the selected questions (e.g., cluster questions or cluster queries) into a database or a storage. The PFF can store any number of cluster questions for any number of clusters on a mapping or embedding space, such as one or more cluster questions per each cluster.

At 708, the PFF can retrieve relevant documents for each selected question. For example, the PFF can utilize any one or more of ML models or GAI models to identify documents in the dataset that provide answers to the question selected at operation 704 and stored at operation 706. The PFF can search the database for any portions of documents in the dataset whose embeddings closely match to the embeddings of the question (e.g., using a similarity function, such as a Euclidean distance or a cosine function). Upon identifying the most suitable documents from the dataset, the GAI model or the ML model can provide the documents to the answer generation service of the PFF.

At 710, the PFF can utilize the answer generation service to generate answers to the selected questions (e.g., cluster queries). The answer generation service can utilize any one or more ML models or GAI models that can be trained using documents of the entity (e.g., dataset on the policies, rules, regulations, processes, technical or any other procedures). The answer generation service can generate answers to the select question, including for example, summaries of answers along with any metadata (e.g., links or sources for the documents used).

At 712, the PFF can utilize its guardrails services to verify that the generated answers at 710 are within predetermined constraints. For instance, the PFF can verify that the embeddings of the generated answers or responses to the cluster queries remain within a predetermined threshold value of the embeddings of the selected questions (e.g., cluster queries).

At 714 the PFF can store the selected answers or response along with their corresponding selected questions in an FAQ database in the storage. For instance, the PFF can utilize a database of FAQ query-response pairs to store the generated selected response to the question selected at 704 as a selected question and selected answer pair. The selected answer and the selected question can be stored along with any metadata identifying documents used for generating the response. In doing so, should these documents be updated in the future, the data processing system can only update or adjust the selected questions or selected responses affected by the change, without having to retrain the entire system. In doing so, the technical solutions allow for saving of computational resources and saving energy by the virtue of reducing the scope of the selected questions and answers that would have to be retrained in the event of updated dataset documents.

At 716, a client device can issue a client query (e.g., a question) via a virtual assistant (e.g., a chatbot). In response to an incoming client query or a client question, the PFF can implement a search engine to search for any pairs of selected questions and selected answers that most closely resemble the question of the client device.

At 718, the PFF can implement an FAQ retrieval service to retrieve the most closely matching FAQ cluster query and response pair. For example, if the PFF determines (e.g., by comparing an embedding of the incoming client query with embeddings of the cluster questions at the mapping) that there is a close match (e.g., a cluster question embedding is within a threshold Euclidean distance away from the embedding of the incoming query), then the PFF can select this selected question along with its corresponding selected response to provide to the client device.

At 720, in response to incoming query at 716, the PFF can utilize FAQ validation functions to update the FAQ. For instance, the PFF can update the mapping with the latest client question. This can cause or trigger one or more of the clusters to get adjusted or modified, thereby also modifying one or more of the selected (e.g., cluster questions) and their corresponding selected responses. The PFF can utilize the ML model and the GAI model to implement any such changes or adjustments.

At 722, the PFF can provide an FAQ validation function for expert review by an admin. The FAQ validation function can allow a user with an expert reviewer access to adjust text of the selected (e.g., cluster) queries and their corresponding selected responses. The FAQ validation function can allow corresponds to the question-response pairs, editing of metadata or any other related information.

Figure 8:
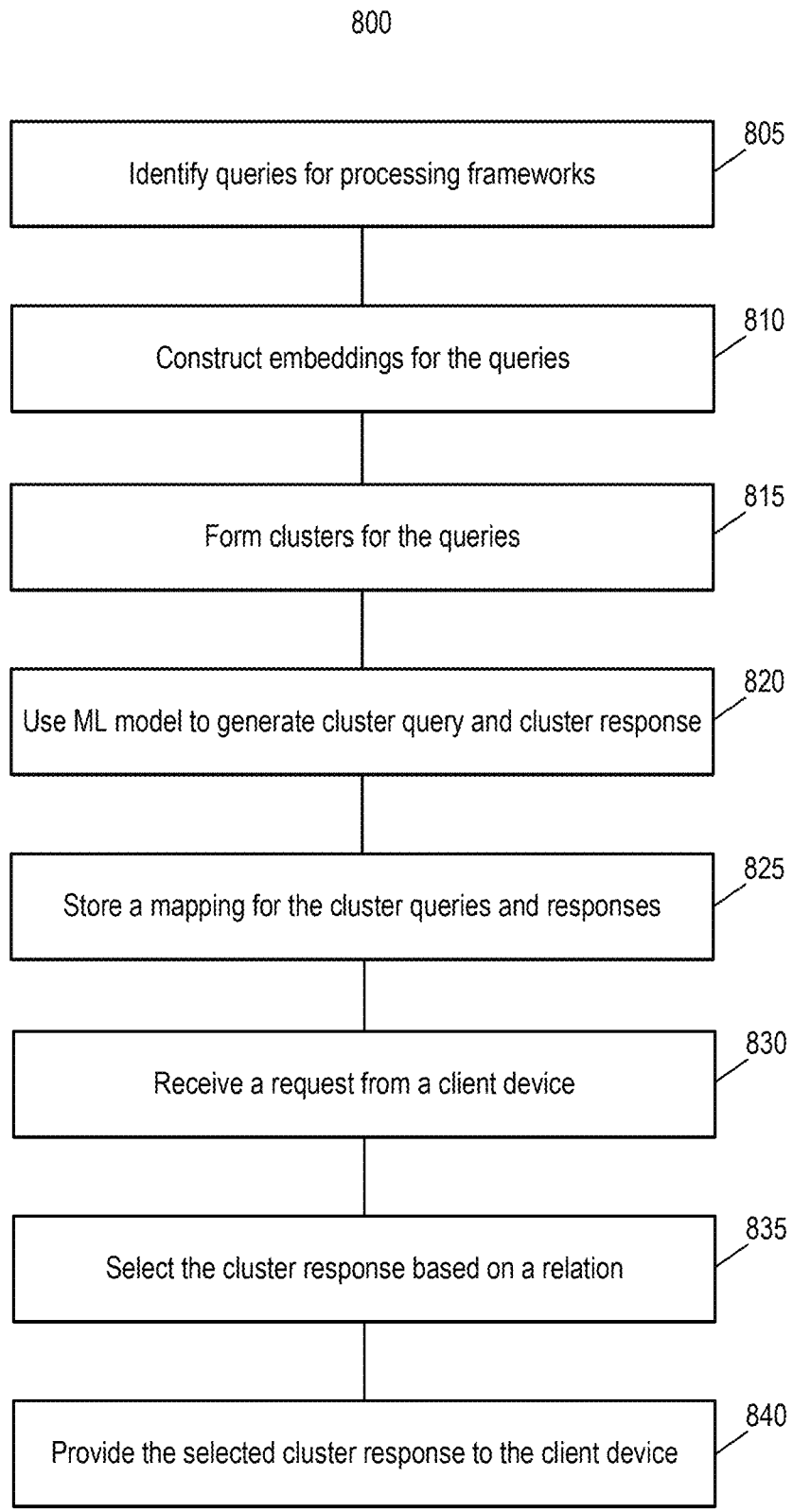
FIG. 8 depicts an example flow diagram of a method for providing machine learning based generation of queries and responses for operational frameworks of entities.

FIG. 8 illustrates a flow diagram of a method 800 for providing machine learning based generation of queries and responses for entity operational frameworks. Method 800 can be utilized to generate FAQ services for an entity and can be performed by one or more systems, features, operations or techniques depicted or discussed in connection with FIGS. 1-7, including, for example, a system 300 or a data processing system 305 of FIG. The data processing system 305, or its functionalities, can be implemented using one or more processors 115 configured to perform the functionalities of the data processing system 305 based on instructions, computer code or data stored on memory or storage (e.g., 120 or 125) of a computing system 100. The method 800 can include acts 800-840. At 805, the method can include identifying queries for processing frameworks. At 810, the method can include constructing embeddings for the queries. At 815, the method can include forming clustering for the queries. At 820, the method can include using ML modeling to generate cluster queries and cluster responses. At 825, the method can include storing a mapping for the cluster queries and responses. At 830, the method can include receiving a request from a client device. At 835, the method can include selecting the cluster response based on a relation. At 840, the method can include providing the selected cluster response to the client device.

At 805, the method can include identifying queries for processing frameworks. The method can include one or more processors coupled with memory implementing a data processing system identifying a plurality of queries corresponding to a plurality of processing frameworks for an entity. For example, the data processing system can monitor, track and identify a plurality of requests or queries from a plurality of client devices received over a virtual assistant (e.g., chatbot). The client device requests or queries can correspond to any processing or operational framework of an entity (e.g., enterprise, corporation or organization).

The requests or queries can be concerning or about any type of a processing or operational framework, such as operational or processing procedures for a payroll process (e.g., calculating taxes, deductions or wages), rules or guidelines of an entity (e.g., employee policy rules or determinations) for performing processing determinations for an employee of an entity, or policies relating availability or processing of assets or benefits (e.g., reimbursements, vacation days, holidays, medical insurance or coverage, or any other information). The client device requests or queries can include questions about general or specific features, data or information about any processing or operational framework, as they pertain to groups of clients or individual clients alone.

The requests or queries can be received via a virtual assistant (e.g., a chatbot) and can be stored in a storage as questions. The data processing system can identify the plurality of queries along with any metadata for the queries corresponding to identity or type of client devices (e.g., client profiles or type of users) that have generated the requests. The data processing system can organize the requests or queries as questions in data structures that can include the questions of the queries as well as any metadata.

At 810, the method can include constructing embeddings for the queries. The method can include the one or more processors constructing a plurality of embeddings for the plurality of queries. For example, the processing framework function can gather the client queries (e.g., questions) provided by various client devices over a time period, such as a prior one or more weeks, one or more months or one or more years. The data processing system can implement or utilize the processing framework function to generate embeddings (e.g., vector representations) of semantic or contextual meaning within a mapping (e.g., embedding space for the historical client provided queries (e.g., gathered and stored over a time period).

The processing framework function can generate the embeddings (e.g., vector representations of one or more words or phrases of a text of the queries) for each one of the prior received client queries in a single mapping space. The mapping can be numerical representations that can be plotted or mapped such that certain subsets of the queries or questions can cluster around particular regions or portions of the embeddings space. Each embedding of the plurality of embeddings can corresponding to a vector representation of at least a portion of a query of each of the plurality of queries (e.g., historical queries of the client devices).

At 815, the method can include forming clustering for the queries. The method can include the one or more processors forming a plurality of clusters for the plurality of queries. The plurality of clusters for the plurality of queries can be formed based on distances in a vector space between the vector representations of the plurality of embeddings (e.g., for the historical queries). For example, as the processing framework function can plot vector representations of each of the queries (e.g., client questions) in a mapping space, some of the vector representations can be more closely spaced next to each other (e.g., clustered) around a particular one or more topics or issues. Such grouping of queries can be identified as a cluster. The mapping can include a plurality of clusters, each of which can include a group of the related or similar queries (e.g., a subset of the plurality of historical queries).

The processing framework function can utilize the ML model and the mapping or semantic clustering services to identify the clusters within the mapping. For example, the processing framework function can identify any number of clusters in the mapping space. The processing framework function can identify clusters based on a Euclidean distance from a central location of the cluster. The processing framework function can identify clusters based on a number of queries in an embedding space. For instance, the processing framework function can identify a cluster for each set threshold number of queries (e.g., define a cluster for each group of 5 or more queries in an embedding space area or portion).

At 820, the method can include using ML modeling to generate cluster queries and cluster responses. The method can include the one or more processors generating, for each cluster of the plurality of clusters, using one or more application programming interface (API) requests to one or more machine learning (ML) models trained on a dataset for the plurality of policies, a cluster query on a processing framework of the plurality of processing frameworks for the respective cluster and a cluster response to the cluster query. The one or more API requests can be generated by the processing framework function to automatically generate the cluster queries (e.g., selected questions) and the cluster responses (e.g., responses for the selected cluster questions).

For instance, the processing framework function can identify the selected query (e.g., the cluster query) for each of the identified clusters. For example, the processing framework function can select a query that is closest to the center of its respective cluster location. The center of the cluster can be an average location value for all the embedding values in a cluster. The processing framework function can identify the center of the cluster (e.g., average value of the cluster embeddings) as the selected query, by generating a search to generate a question using the ML model, based on the embedding of the center location.

The method can include the one or more processors identifying, from a plurality of documents of the dataset, a document of the plurality of documents that corresponds to at least one of the cluster query or the cluster response. The processing framework function can associate the document with the at least one of the cluster query or the cluster response. For example, the processing framework function can utilize the ML model or the GAI model to identify all the relevant documents for each selected response to each of the cluster queries. The relevant documents can be associated with the selected responses or the selected queries using metadata tags (e.g., document version, document date, document author, document link, source information, or any other information or data).

The method can include the one or more processors receiving an updated dataset comprising a change in a content of the document. The change in the content can correspond to a portion of the content used for generating a selected response for a selected query (e.g., cluster query). In response to identifying that the portion of the content used for the selected query was modified, the processing framework function can retrain the selected query or the selected response using the updated or changed content. For example, the processing framework function can modify, responsive to the change in the content and the association, at least one of the cluster query or the cluster response.

For example, the processing framework function can identify a modification to the cluster query. Responsive to this modification and using the one or more ML models (e.g., ML model or the GAI model), the one or more processors can generate a modified cluster response. The one or more processors can store, in the storage, the modified cluster query as the cluster query and the modified cluster response as cluster response. For instance, the updated clustery query and the cluster response can be stored as the selected query and the selected response for the given cluster. The one or more processors can identify a modification to the cluster response. The one or more processors can store, in the storage, the modified cluster response and selecting, using the mapping, from the storage, the modified cluster response as the cluster response.

At 825, the method can include storing a mapping for the cluster queries and responses. The method can include the one or more processors storing, in a storage, a mapping of each cluster query to each cluster response for each of the plurality of clusters. The stored mapping can include any one of, or any combination of: a mapping of selected queries or questions (e.g., cluster queries), a mapping of selected responses or answers (e.g., cluster responses), a mapping of questions or queries of client devices, a mapping of responses to queries of client devices, or a mapping of documents of the dataset.

For example, the processing framework function can modify, responsive to the modification of at least one of the cluster query or the cluster response, the mapping with respect to at least one of the modified cluster query or the modified cluster response. For instance, in response to determining that a single document used for a single selected response to a single cluster query has been modified, the processing framework function can retrain at least one of the selected query or the selected response. For example, the processing framework function can choose to update or adjust only the selected response to the selected query affected by the document change, leaving all the other selected responses and selected queries unchanged.

At 830, the method can include receiving a request from a client device. The method can include receiving, from a client device, a request for information regarding at least one of the plurality of processing frameworks. The client device can access the data processing system via a virtual assistant (e.g., a chatbot service) allowing the client device to ask questions and receive responses. The client device can issue a query having any question, such as a question pertaining to any processing framework. For instance, the query can include a question on one or more processing rules or regulations for an entity or an employee of an entity, a question on availability of an asset or a service for a user, a question pertaining to a policy or a procedure of an entity or any other processing framework related to HR or payroll services, computations or matters.

The method can include the data processing system receiving any number of queries from any number of client devices. For instance, the one or more processors can operate the virtual assistant that receives, via a network, a second query from a second client device of the plurality of clients. The second query can be same or different than a first query.

At 835, the method can include selecting the cluster response based on a relation. The method can include selecting, using the mapping, the cluster response based on a relation between the cluster query and the request. The method can include determining the relation between the request and the cluster query. The relation can be determined based on an embedding of at least a portion of the request and an embedding of the plurality of embeddings of the cluster query. The relation can be determined based on a distance in the vector space between the embedding of at least the portion of the request and the embedding of the cluster query. The distance in the vector space (e.g., embedding space or the mapping) can be determined using, for example, Euclidean distance or a cosine similarity function.

The method can include the one or more processors determining, based on the mapping, that the second query (e.g., from the same client device or a different client device as the first query at 805) is not associated with any of a plurality of cluster queries for the plurality of processing frameworks. For example, the processing framework function can generate, responsive to the determination and using at least a portion of the second query input into the one or more ML models, a second response to the second query. For instance, processing framework function can input the text from at least a portion of the second query into one or more ML models (e.g., ML model or GAI model) to generate a response.

At 840, the method can include providing the selected cluster response to the client device. The method can include the data processing system providing, from the storage, for display on the client device, the selected cluster response responsive to the request. For example, the processing framework function can provide the response (e.g., selected cluster response or generated response) to the client device, via a virtual assistant (e.g., chatbot). The response can be provided in a message or a transmission, via a network, such that it can be displayed on a display of the client device.

For example, the processing framework function can provide, for display on the second client device, the second response responsive to the second request. The second response can be a response generated by the one or more ML models in response to determining that the second request is dissimilar from all the clustered question answer pairs. The response or the second response can include text of a selected response to the selected question (e.g., cluster question) that is closest in the embedding space to the question in the user's query. For example, the data processing system can provide to the client device the response that includes the selected question and the selected response, along with any metadata (e.g., document links, links to sources or related relevant information allowing the user to further research the topic or the issue of the question). The response can include metadata of the documents of other selected responses of the same cluster of questions, allowing the user to search the documents relevant to the cluster to which the client's query most closely maps (e.g., or maps within).

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system comprising:
one or more processors coupled with memory to:
identify a plurality of queries corresponding to a plurality of processing frameworks for an entity;
construct a plurality of embeddings for the plurality of queries, each embedding of the plurality of embeddings corresponding to a vector representation of at least a portion of a query of the plurality of queries;
form a plurality of clusters for the plurality of queries based on distances in a vector space between the vector representations of the plurality of embeddings;
generate, for each cluster of the plurality of clusters, using one or more application programming interface (API) requests to one or more machine learning (ML) models trained on a dataset for a plurality of policies, a cluster query on a processing framework of the plurality of processing frameworks for the respective cluster and a cluster response to the cluster query;
store, in a storage, a mapping of each cluster query to each cluster response for each of the plurality of clusters;
modify, responsive to a change in a document that is associated with a cluster of the plurality of clusters, the mapping of the cluster;
receive, from a client device, a request for information regarding at least one of the plurality of processing frameworks;
select, using the mapping modified responsive to the change in the document, the cluster response based on a relation between the cluster query and the request; and
provide, from the storage, for display on the client device, the selected cluster response responsive to the request.

2. The system of claim 1, comprising the one or more processors to:
identify from a plurality of documents of the dataset, a document of the plurality of documents that corresponds to at least one of the cluster query or the cluster response; and
associate the document with the at least one of the cluster query or the cluster response.

3. The system of claim 2, comprising the one or more processors to:
receive an updated dataset comprising a change in a content of the document; and
modify, responsive to the change and the association, at least one of the cluster query or the cluster response.

4. The system of claim 3, comprising the one or more processors to:
modify, responsive to the modification of at least one of the cluster query or the cluster response, the mapping with respect to at least one of the modified cluster query or the modified cluster response.

5. The system of claim 1, comprising the one or more processors to:
identify a modification to the cluster query;
generate, responsive to the modification and using the one or more ML models, a modified cluster response; and
store, in the storage, the modified cluster query as the cluster query and the modified cluster response as cluster response.

6. The system of claim 1, comprising the one or more processors to:
identify a modification to the cluster response; and
store, in the storage, the modified cluster response; and
select, using the mapping, from the storage, the modified cluster response as the cluster response.

7. The system of claim 1, comprising the one or more processors to:
determine the relation between the request and the cluster query based on an embedding of at least a portion of the request and an embedding of the cluster query.

8. The system of claim 7, wherein the relation is determined based on a distance in the vector space between the embedding of at least the portion of the request and the embedding of the cluster query.

9. The system of claim 1, comprising the one or more processors to:
receive a second query from a second client device of the plurality of clients;
determine, based on the mapping, that the second query is not associated with any of a plurality of cluster queries for the plurality of processing frameworks;
generate, responsive to the determination and using at least a portion of the second query input into the one or more ML models, a second response to the second query; and provide, for display on the second client device, the second response responsive to the second query.

10. A method comprising:
identifying, by one or more processors coupled with memory, a plurality of queries corresponding to a plurality of processing frameworks for an entity;
constructing, by the one or more processors, a plurality of embeddings for the plurality of queries, each embedding of the plurality of embeddings corresponding to a vector representation of at least a portion of a query of the plurality of queries;
forming, by the one or more processors, a plurality of clusters for the plurality of queries based on distances in a vector space between the vector representations of the plurality of embeddings;
generating, by the one or more processors, for each cluster of the plurality of clusters, using one or more application programming interface (API) requests to one or more machine learning (ML) models trained on a dataset for a plurality of policies, a cluster query on a processing framework of the plurality of processing frameworks for the respective cluster and a cluster response to the cluster query;
storing, by the one or more processors, in a storage, a mapping of each cluster query to each cluster response for each of the plurality of clusters;
modifying, by the one or more processors, responsive to a change in a document that is associated with a cluster of the plurality of clusters, the mapping of the cluster;
receiving, by the one or more processors, from a client device, a request for information regarding at least one of the plurality of processing frameworks;
selecting, by the one or more processors, using the mapping modified responsive to the change in the document, the cluster response based on a relation between the cluster query and the request; and
providing, by the one or more processors, from the storage, for display on the client device, the selected cluster response responsive to the request.

11. The method of claim 10, comprising:
identifying, by the one or more processors, from a plurality of documents of the dataset, a document of the plurality of documents that corresponds to at least one of the cluster query or the cluster response; and
associating, by the one or more processors, the document with the at least one of the cluster query or the cluster response.

12. The method of claim 11, comprising:
receiving, by the one or more processors, an updated dataset comprising a change in a content of the document; and
modifying, responsive to the change in the content and the association, at least one of the cluster query or the cluster response.

13. The method of claim 12, comprising:
modifying, responsive to the modification of at least one of the cluster query or the cluster response, the mapping with respect to at least one of the modified cluster query or the modified cluster response.

14. The method of claim 10, comprising:
identifying, by the one or more processors, a modification to the cluster query;
generating, responsive to the modification and using the one or more ML models, a modified cluster response; and storing, in the storage, the modified cluster query as the cluster query and the modified cluster response as cluster response.

15. The method of claim 10, comprising:
identifying, by the one or more processors, a modification to the cluster response; and
storing, in the storage, the modified cluster response; and
selecting, using the mapping, from the storage, the modified cluster response as the cluster response.

16. The method of claim 10, comprising:
determining the relation between the request and the cluster query based on an embedding of at least a portion of the request and an embedding of the plurality of embeddings of the cluster query.

17. The method of claim 16, wherein the relation is determined based on a distance in the vector space between the embedding of at least the portion of the request and the embedding of the cluster query.

18. The method of claim 10, comprising:
receiving, by the one or more processors, a second query from a second client device of the plurality of clients;
determining, by the one or more processors based on the mapping, that the second query is not associated with any of a plurality of cluster queries for the plurality of processing frameworks;
generate, responsive to the determination and using at least a portion of the second query input into the one or more ML models, a second response to the second query; and
provide, for display on the second client device, the second response responsive to the second query.

19. A non-transitory computer-readable medium storing program instructions that, when executed by one or more processors, cause the one or more processors to:
identify a plurality of queries corresponding to a plurality of processing frameworks for an entity;
construct a plurality of embeddings for the plurality of queries, each embedding of the plurality of embeddings corresponding to a vector representation of at least a portion of a query of the plurality of queries;
form a plurality of clusters for the plurality of queries based on distances in a vector space between the vector representations of the plurality of embeddings;
generate, for each cluster of the plurality of clusters, using one or more application programming interface (API) requests to one or more machine learning (ML) models trained on a dataset for a plurality of policies, a cluster query on a processing framework of the plurality of processing frameworks for the respective cluster and a cluster response to the cluster query;
store, in a storage, a mapping of each cluster query to each cluster response for each of the plurality of clusters;
modify, responsive to a change in a document that is associated with a cluster of the plurality of clusters, the mapping of the cluster;
receive, from a client device, a request for information regarding at least one of the plurality of processing frameworks;
select, using the mapping modified responsive to the change in the document, the cluster response based on a relation between the cluster query and the request; and
provide, from the storage, for display on the client device, the selected cluster response responsive to the request.

20. The non-transitory computer-readable medium of claim 19, wherein the program instructions further include instructions to:

identify from a plurality of documents of the dataset, a document of the plurality of documents that corresponds to at least one of the cluster query or the cluster response;

associate the document with the at least one of the cluster query or the cluster response;

receive an updated dataset comprising a change in a content of the document;

modify, responsive to the change and the association, at least one of the cluster query or the cluster response; and modify, responsive to the modification of at least one of the cluster query or the cluster response, the mapping with respect to at least one of the modified cluster query or the modified cluster response.

\* \* \* \* \*